March 7, 1939.  G. A. SNYDER  2,149,690
BLOOD PRESSURE TESTING MACHINE
Filed Aug. 14, 1935    6 Sheets-Sheet 1

INVENTOR
GEORGE A. SNYDER
BY James M. Abbett
ATTORNEY

March 7, 1939. G. A. SNYDER 2,149,690
BLOOD PRESSURE TESTING MACHINE
Filed Aug. 14, 1935 6 Sheets-Sheet 2
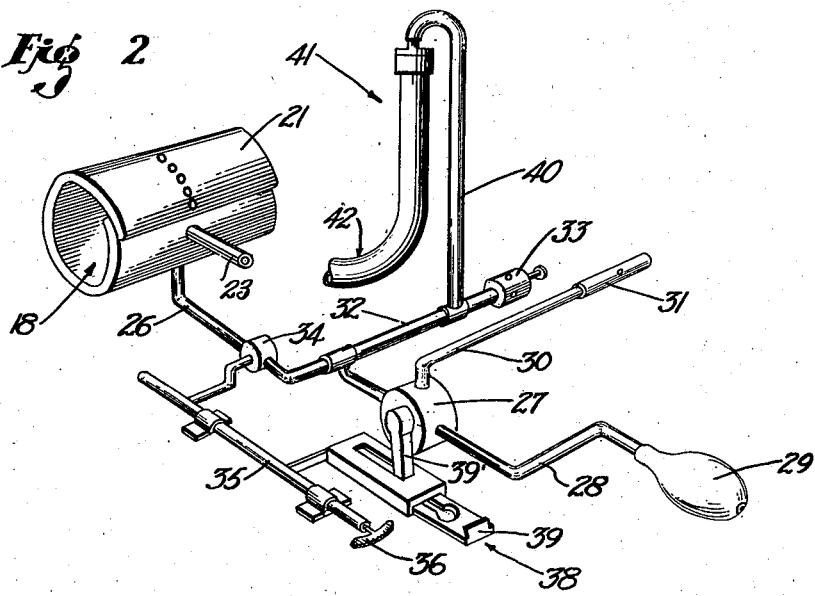
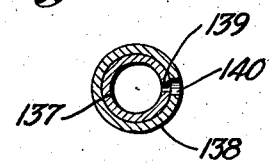
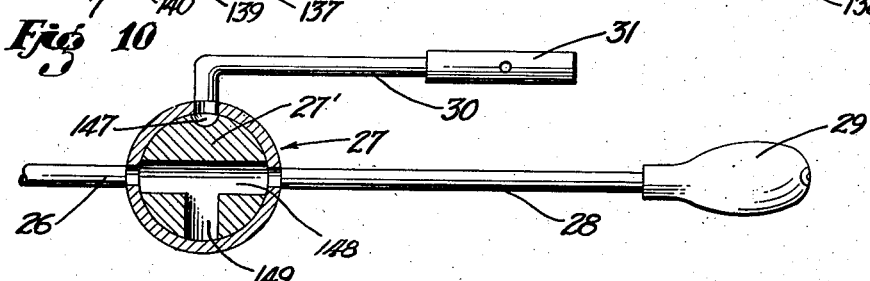
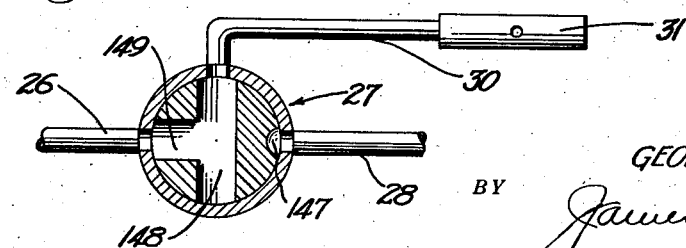
INVENTOR
GEORGE A. SNYDER
BY James M. Abbett
ATTORNEY

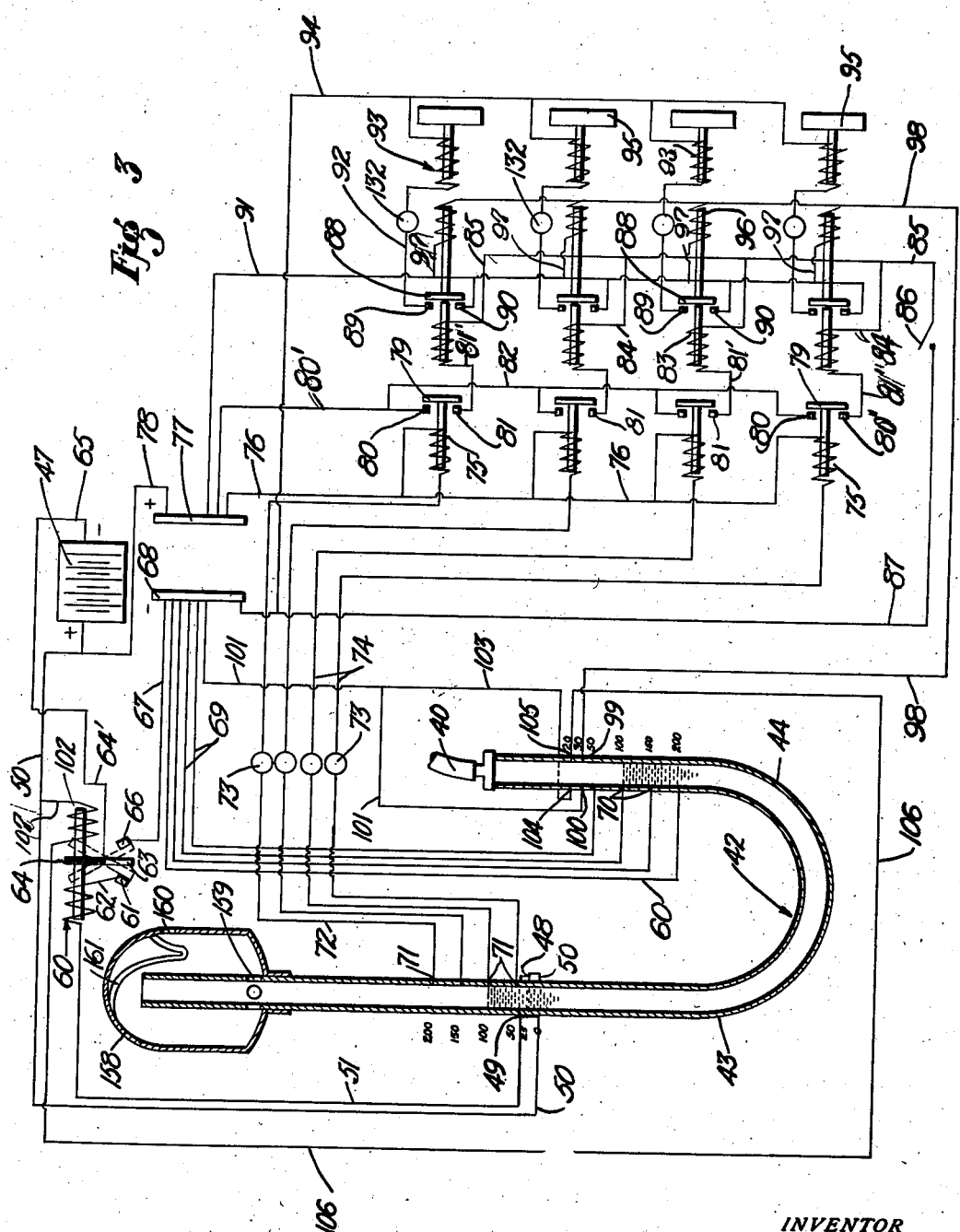

March 7, 1939.                G. A. SNYDER                2,149,690
                        BLOOD PRESSURE TESTING MACHINE
                           Filed Aug. 14, 1935           6 Sheets-Sheet 4
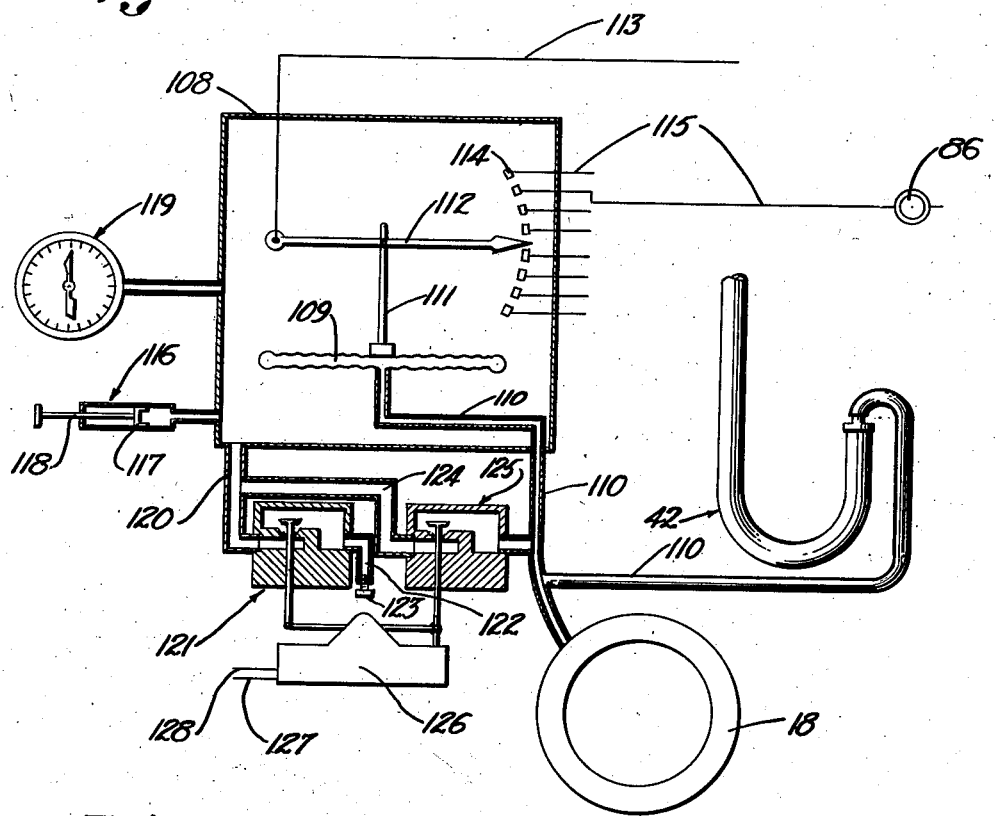
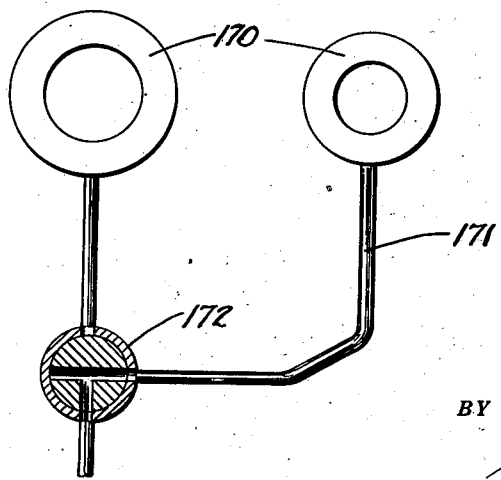
INVENTOR
GEORGE A. SNYDER
BY James M. Abbett
ATTORNEY March 7, 1939.  G. A. SNYDER  2,149,690
BLOOD PRESSURE TESTING MACHINE
Filed Aug. 14, 1935  6 Sheets-Sheet 5
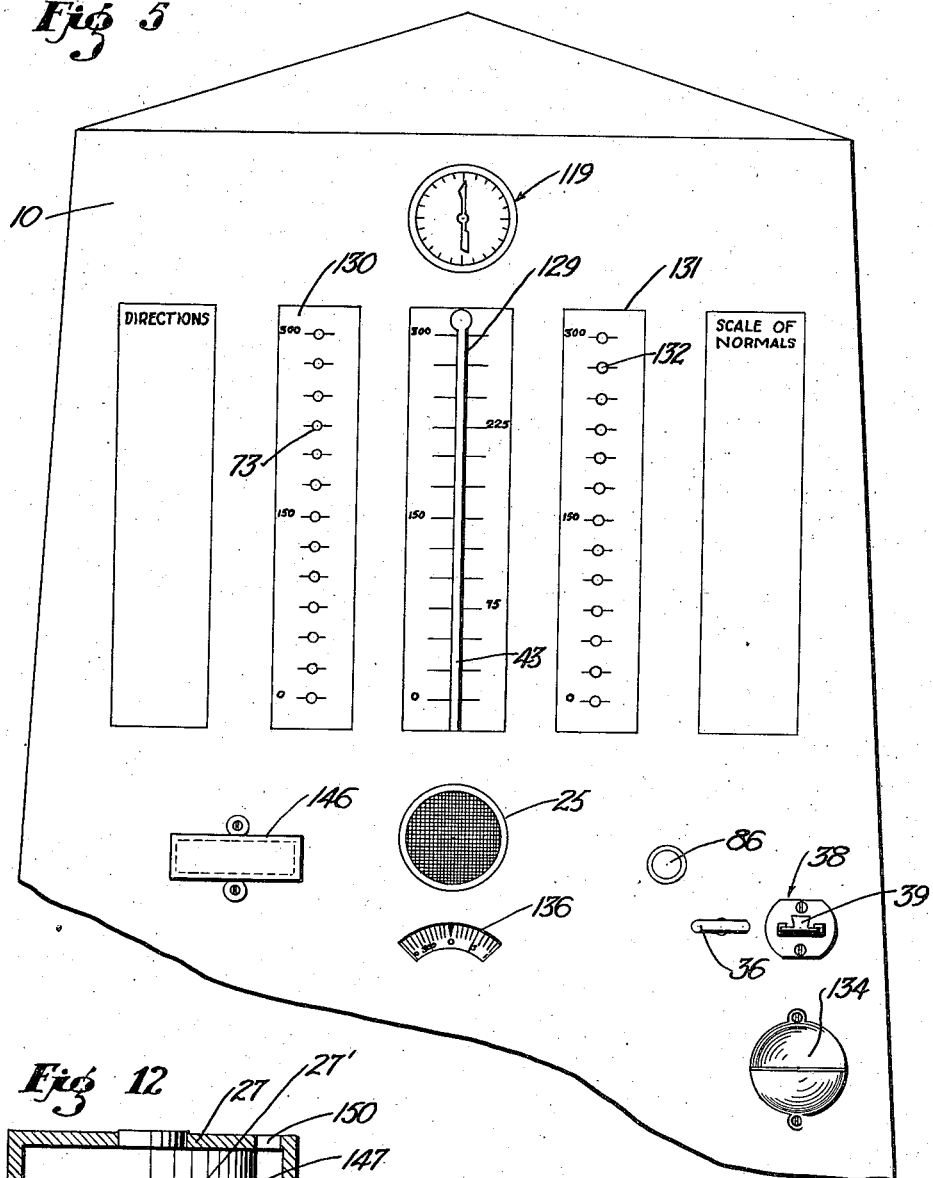
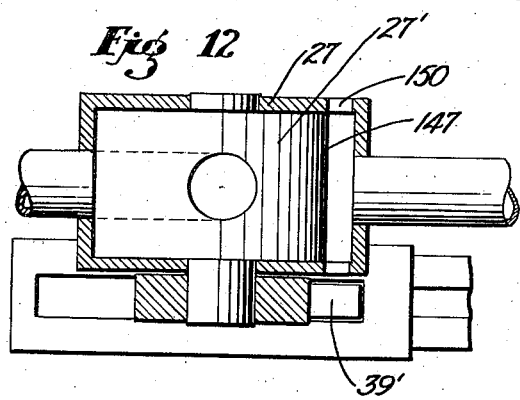
INVENTOR
GEORGE A. SNYDER
BY
James M. Abbott
ATTORNEY March 7, 1939.   G. A. SNYDER   2,149,690
BLOOD PRESSURE TESTING MACHINE
Filed Aug. 14, 1935   6 Sheets-Sheet 6
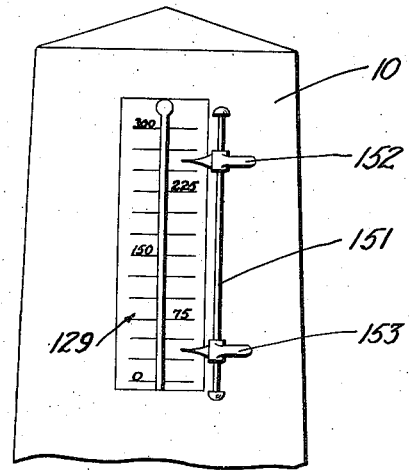
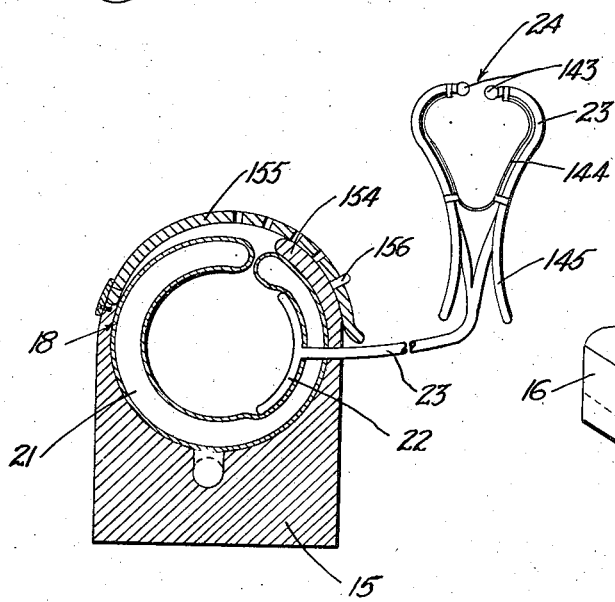
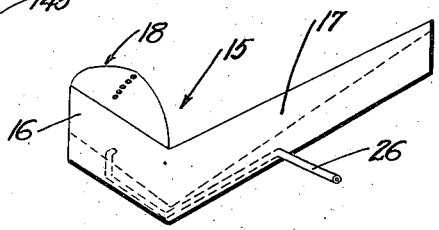
INVENTOR
GEORGE A. SNYDER
BY
James M. Abbett
ATTORNEY Patented Mar. 7, 1939

2,149,690

UNITED STATES PATENT OFFICE 2,149,690

BLOOD PRESSURE TESTING MACHINE

George A. Snyder, West Hollywood, Calif.

Application August 14, 1935, Serial No. 36,242

11 Claims. (Cl. 128—2.05)

This invention relates to a testing machine, and particularly pertains to a blood pressure testing machine and is a continuation in part of my co-pending application for U. S. Letters Patent entitled Blood pressure testing machine S. N. 731,890 filed June 22, 1934.

It has been found desirable to provide a blood pressure testing machine which may be placed at the disposal of the general public for use in testing and indicating or recording the blood pressure of a person operating the machine, and which machine is coin controlled. It is the principal object of the present invention, therefore, to provide a blood pressure testing machine equipped with means for receiving the arm of the patient whose blood pressure is to be tested so that the test at all times may be made under uniform conditions, the machine being further provided with means for measuring the magnitude of blood pressure, means for indicating or recording the measured magnitude of blood pressure, and operating means coin controlled and thereafter automatically acting to initiate the measuring means to relieve fluid pressure within the measuring system, and to finally make an indication or produce a record of the measured pressure, and to restore the machine to its original position preparatory for a subsequent coin operation, the invention being also concerned with various detailed refinements of an apparatus of the class described.

The present invention contemplates the provision of an upright standard carrying pressure indicating means, or recording means, operatively associated with pressure measuring means and coin controlled operating means, said standard also being provided with a suitable arm rest with which is associated a pressure cuff adapted to receive the arm of the person whose blood pressure is to be tested, the invention further contemplating the provision of a suitable seat for the person whose blood pressure is being tested so that the operation may be carried out while the patient is at rest, and his arm is properly adjusted with relation to the arm rest and the control mechanism is properly presented to him for easy manipulation by the free arm.

The invention is illustrated by way of example in the accompanying drawings in which:

Fig. 2 is a view in perspective showing part of the operating structure of the blood pressure machine.

Fig. 3 is a view in diagram showing one form of the blood pressure measuring, indicating and recording unit and discloses the U gauge in longitudinal section.

Fig. 4 is a view in section and elevation showing a schematic arrangement of the oscillometer a type of device.

Fig. 5 is a front view of the blood pressure testing machine showing an assembly of the various gauges and indicators of the apparatus.

Fig. 6 is a view in section and elevation showing the differential bleeder valve element.

Fig. 7 is a view in transverse section through the bleeder valve as seen on the line 7—7 of Fig. 6.

Fig. 8 is a view in elevation showing a form of stethoscope earphones which may be actuated by one hand of the operator and further indicating in section a pressure cuff as employed with the stethoscope.

Fig. 9 is a view showing a multiple cuff arrangement whereby cuffs may be selected for use which will fit the arm of the person whose blood pressure is being taken, without adjustment.

Fig. 10 is a view in section and elevation showing the control valve in a pumping position.

Fig. 11 is a view similar to Fig. 10 showing the control valve in a bleeding position.

Fig. 12 is a view in transverse horizontal section through the control valve indicating means for preventing escape of air from the bulb when the valve is in bleeding position.

Fig. 13 is a view in side elevation showing the arm rest and showing a variation in design from that indicated in Fig. 1.

Fig. 14 is a view in elevation showing a form of gauge with indicators thereon which may be manually set.

Figure 1:
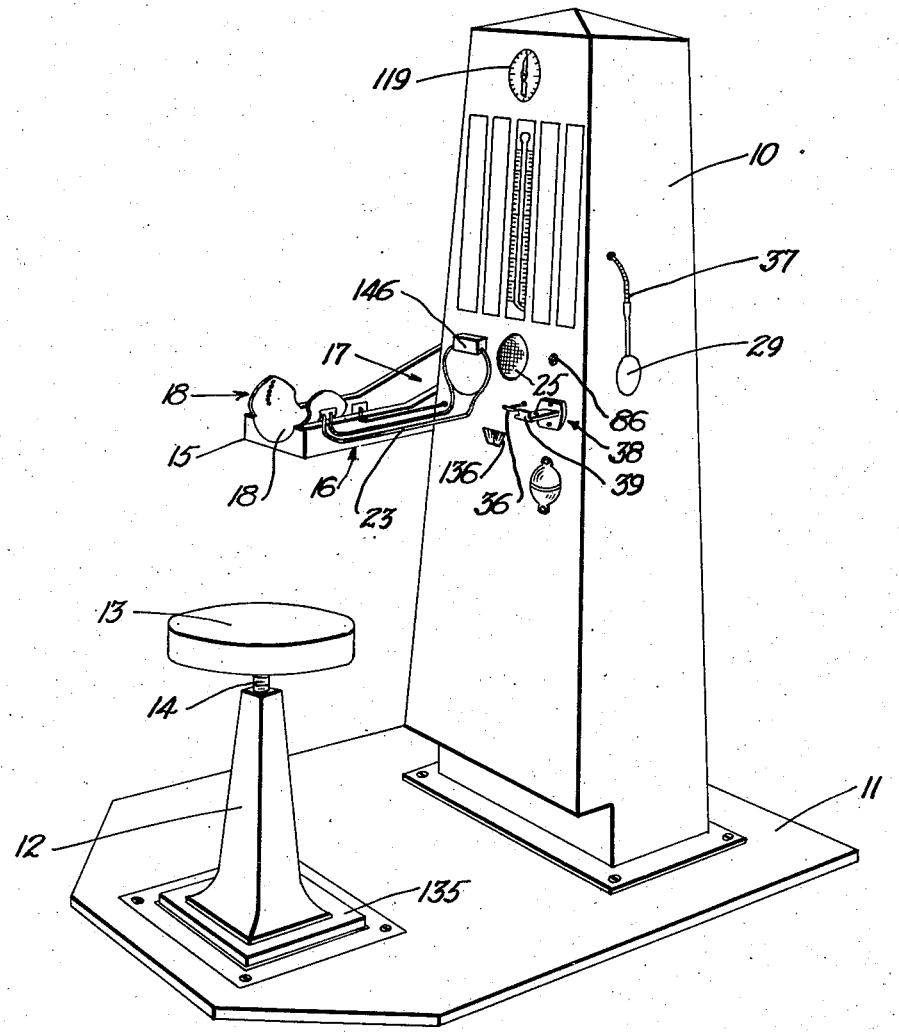
Figure 1 is a view in perspective showing the preferred form of blood pressure machine with which the present invention is concerned.

Referring more particularly to the drawings, 10 indicates a standard or pedestal providing a support and housing for the blood pressure machine. This pedestal may be mounted on a suitable base 11 forming a floor upon which the operator may stand prior to the testing operation. 12 indicates the pedestal of a seat 13. The seat is preferably mounted on the base 11 so that it may remain in fixed relation to the pedestal 10 to thus insure that the patient may be positioned properly when a blood pressure test is being made. It may be found desirable to provide adjusting means 14 between the member 12 and the seat 13 for regulating the position of the patient with relation to an arm rest 15 and thus insuring that the arm may be held naturally without undesirable tension. This arm rest is secured at the left side of the pedestal 10 and is formed with a forwardly extending portion 16, and an upwardly extending portion 17. The relationship of these parts is shown at slightly different angles in Fig. 13. The angular relation of the portions 16 and 17 to the pedestal 10 is such as to insure that the distal portion of the upper arm will be properly supported to expose the artery area of the arm before making a blood pressure test and to support the arm in a set and natural position without tension so that proper conditions will prevail for the test, since the test is not made under the supervision of an attendant. The upper face of the members 16 and 17 are transversely curved to form a trough-like seat for the arm and to hold the arm in a fixed position for the test. Secured at the outer end of the portion 16 of the arm rest 15 is a pressure cuff 18. This cuff is preferably provided with a strap and a means for tightening the cuff, the outer end of the strap being formed in a manner to prevent it from being accidentally withdrawn through the catch. The cuff 18 is formed with a sealed pneumatic portion 21 therein so that the cuff may be inflated to create pressure around the area of the person's arm to which it is applied, and thus to bind the same in a manner to make a blood pressure test, as will be hereinafter described.

Disposed in fixed relation to the cuff is a stethoscope, or other sound pickup, generally indicated at 22 in the drawings, and by which the sound or pulsation produced by the pressure of blood within the artery may be ascertained. Connected with the sound pickup 22, such, for example, as the stethoscope indicated in the drawings, is a tube 23 through which sound is transmitted to the ear set 24 of the stethoscope or to sound amplifying means, such, for example, as a loud speaker indicated at 25 in Fig. 1 of the drawings. The cuff is secured in a position to be readily applied to the arm of the person as the arm is slipped through the cuff before it is tightened in place. Various types of inflation means might be provided, but as shown in Fig. 2 of the drawings, a pressure tube 26 is connected with the cuff and is in turn connected with a valve structure 27 which may be moved to a position to establish communication between a pressure supply tube 28 and a bulb 29, or other means substituted therefor to create a desired air pressure. The valve 27 may be moved to another position to allow communication between the tube 26 and a bleeder tube 30 through which air may leak at a relatively slow rate of speed as controlled by a bleeder valve 31. Connected with the tube 26 is a tube 32 provided with a popoff valve 33 so that in the event an attempt is made to supply more air to the tube 26 than is required, the valve 33 will open to release air from the system. Interposed at a point in the line of the tube 26 is an emergency relief valve 34 which is operated by a rod 35, the rod normally acting to hold the valve open. This rod extends forwardly from the pedestal 10 and is provided at its outer end with a knob 36 by which it may be operated optionally. It is to be understood that the tube 26 is suitably concealed within the arm rest 15 and that the remainder of the apparatus is housed within the standard or pedestal 10 with the exception of the pressure bulb 29 which hangs down at the lower end of the tube 28. For protection the portion of the tube 28 outside of the pedestal 10 is sheathed in a metal sleeve 37. The valve 27 may be moved to its operative and inoperative position by a suitable coin control mechanism 38 which is provided with a slide 39 which when retracted and inoperative extends outwardly from the face of the pedestal 10, and will at that time establish communication between the tube 26 and the bleeder tube 30. The tube 32 is provided with an extension 40 which leads to a pressure measuring device, such, for example, as a mercury type of manometer 41. This device, as particularly shown in Fig. 3, comprises a U-tube 42 having a primary vertical leg 43 and a secondary vertical leg 44. Contained within the U-tube is a body of mercury which is acted upon by the pressure of air delivered through pipe 40. The U-tube may be made in the conventional manner from glass, but, if desired, any other material may be used, since secondary indicating means are provided so that the observation of the position of the mercury within the column is not necessary. The secondary means is controlled preferably by contacts which are disposed along the walls of the tube 42 in the primary and secondary columns respectively, and which will complete electric circuits through the secondary column indicating apparatus.

An example of the method of connecting a device of this character is particularly shown in Fig. 3 of the drawings where 47 indicates a source of electrical supply. When pressure is supplied to one end of the mercury column in the U tube 43 through bulb 29 with the control valve 27 in the position shown in Fig. 10 of the drawings, the mercury within the leg 44 of the U tube will be forced downwardly and the mercury in leg 43 of the U tube will be forced upwardly. At a point below the pressure at which any normal pressure reading can be taken, such, for example, as at the graduation indicated by the degree 25, the mercury will contact spaced contact members 48 and 49 in the wall of the leg 43 of the mercury column and will complete a circuit from conductor 50 leading from the source of supply 47 to contact 48, thence across the mercury to contact 49 and then along the conductor 51 to a coil of a solenoid 60. The other pole of the solenoid 60 is connected with a switch contact 61 by a conductor 62. This contact is normally held in electrical connection with an oscillating switch blade 63 by a spring 64. The switch blade 63 is provided with a conductor 64' leading to a return wire 65 connected to the opposite pole of the source of electrical supply 47. When the solenoid 60 is thus energized, the switch 63 will swing out of contact with the member 61 and when it passes center, spring 64 will draw it into contact with a switch contactor 66. This contactor is connected with a wire 67 leading to a bus bar 68 through which numerous connections are made, as will be hereinafter described. The bus bar is provided with a plurality of conductors 69 which separately lead to contacts 70 in the wall of the leg 44 of the mercury column 42. These contacts are spaced at different levels representing different degrees of pressure within the column and while the drawing only shows four of these contacts, it will be understood that a plurality of contacts are provided spaced sufficiently close together to insure that readings may be progressively made with a relatively small increment of graduation between them. The contacts 70 through leg 44 of the U-tube 42 are arranged in inverse order to a set of contacts 71 disposed in the leg 43 of the U-tube 42 and which represent the same degree of spacing as previously described for contacts 70. Contacts 71 are each provided with one of a series of conductors 72 which here are shown as leading to one set of terminals of lights 73 forming a part of an illuminated scale. The opposite terminals of the lights 73 are fitted with conductors 74 which separately lead to solenoids 75. A return wire from the solenoids 75 connects with a common lead wire 76. This lead wire is secured to a bus bar 77 positively connected with the lead wire 78 leading to the opposite pole of the source of electric energy 47 from the pole to which conductor 65 is connected. Energization of a solenoid 75 draws a switch member 79 into simultaneous contact with contacts 80 and 81. The contacts 80 are connected to a common lead wire 82 secured to the bus bar 77. The contacts 81 are connected to individual wires 81' leading to solenoids 83, the opposite sides of which are connected with the wires 84 leading to a conductor 85. The conductor 85 is connected to one side of a switch 86. The opposite side of the switch is connected by a conductor 87 to the bus bar 68. Each solenoid 83 when energized draws its switch member 88 into contact with terminals 89 and 90. The terminal 90 connects with conductor 91 which is a common lead wire to bus bar 77. Terminal 89 connects with wire 92 leading to a magnet 93 through which a circuit to bus bar 68 is completed through a wire 94. The magnets 93 separately actuate a printing or recording member generally indicated at 95 and by which a blood pressure value is printed corresponding to the value on the leg 43 of the U-tube 42 at which the switch 86 is momentarily closed. The closing of the switch 86 is to take place twice in the operation of the machine; once when a systolic pressure is indicated and once when a diastolic pressure is indicated; thus the printing or recording members will be operated twice and will indicate on a ticket or tape, two readings, such, for example; a systolic pressure of 138 and a diastolic pressure of 114. After the recordings have been made, the apparatus must be restored to its original condition. This is accomplished first by solenoids 96 which are provided with conductors 97, connected with the common lead wire 91 to bus bar 77 and wire 98, leading to a contact 99 in the wall of leg 44 of the tube 42, disposed at a level representing gauge graduation 30. The circuit continues through the mercury to contact 100 in the tube wall and at the level of contact 99. A conductor 101 completes the circuit to bus bar 68. When the mercury in the tube 42 has settled in leg 43 to the graduation 25 and has risen to a corresponding level in leg 44, the main supply of current to the machine is broken by a solenoid 102 which moves switch blade 63 from contact with member 66 to contact with member 61. The circuit for solenoid 102 is completed from bus bar 68 through the wire 101 to a wire 103. This wire is attached to a contact 104 in the wall of leg 44 of tube 42 at the level of graduation 20. A contact 105 in the wall and at the same level is connected with a wire 106 leading to one side of solenoid 102. The other terminal of this solenoid connects through wire 107 with wire 50 which is a return to the source of supply 47.

Referring more particularly to Fig. 4 of the drawings, an apparatus is shown by which blood pressure may be taken by an oscillometer type. In this type of machine the magnitude of arterial pulsation is measured as distinguished from the degree of blood pressure measured in the form of apparatus shown in Fig. 3. In this structure a housing 108 is provided within which is hermetically sealed a pressure responsive cell 109. This cell is provided with a tube 110 leading to a pressure cuff 18. The opposite side of the cell is connected with a standard 111 adapted to actuate a dial hand 112. This hand is electrically connected to a conductor 113 and moves across a series of contact members 114, each of which is separately connected to conductors 115. The conductors 115 agree in their function with the conductors 85 as previously shown and described in connection wth Fig. 3, and tend to complete circuits effected by the control button 86. The circuit is further completed through conductor 113.

It is not believed to be necessary to repeat the entire wiring structure as shown in Fig. 3. The housing 108 is hermetically sealed and any desired air pressure may be created within it, such as by the pump 116, which connects with the housing and within which a plunger 117 is reciprocated by plunger rod 118. A gauge 119 is also connected with the housing 108 so that the fluid pressure within the housing may be ascertained with accuracy. A relief tube 120 connects with the housing and is provided with a valve 121. This valve may be operated by a mechanism to be hereinafter described. An exhaust tube 122 is connected with the housing of valve 121 and has an adjusting screw 123 by which the rate of fluid leak from the housing 108 may be established. The relief tube 120 connects with the cuff tube 110 through a cross tube 124. A cutoff valve 125 is interposed at some point in the length of the tube 124. This valve may be periodically operated by a suitable means, such, for example, as a solenoid operated time switch mechanism 126 which includes electrical conductors 127 and 128 leading to a timing mechanism therein. These solenoids within the switch mechanism act alternately to periodically and simultaneously operate the valves 121 and 125. Thus, the slow leak will be cut off and the oscillometer gauge will be cut on and vice versa. It is also to be understood that in connection with this same structure there is a cuff 18 similar to that shown and described in Fig. 2 of the drawings which will actuate the mercury gauge. In this manner it will be possible to determine both the point of oscillation of the oscillometer and the pressure at which oscillation takes place, as indicated by the mercury gauge, or other suitable fluid responsive gauge means.

Referring particularly to Fig. 5 of the drawings, the front view of the blood pressure testing machine is shown embodying all of the features of the invention as previously described. This includes the main gauge 129 by which indication is made by mercury column 43, and a gauge 130 operating lights 73 as the column of mercury rises and falls. Gauge 131 operating a plurality of signal lights 132 interposed in the circuit through wires 92 will indicate the systolic and diastolic pressures at which the switch 86 is closed. The oscillometer gauge 119 is shown at the top of the structure, while below the main gauge is a loud speaker 25 which may be connected with the stethoscope 22 or other sound pickup and by which loud speaker system the sounds may be heard without using the earphones 24. The ticket stamping button 86 is shown on the front panel together with a pocket 134 from which the ticket may be ejected. The slot operative mechanism is generally indicated at 38 in Fig. 5 of the drawings, and the emergency valve control is indicated at 36.

In some instances it may be desirable to apprise a person of his weight. In this event any type of scales may be embodied within the structure 10 with the pedestal 12 of the seat resting on a platform 135. The scale reading will be visible at 136.

It has been found that in connection with a mercury column such as used in this particular case that the column will fall at a rate of speed in direct ratio to the height of the column. Thus, when the mercury column is pumped to a high elevation it will fall faster than it will when it reaches a lower elevation. For that reason, as shown in Fig. 6, an adjusting valve structure 31 is provided which is connected with the bleeder tube 30, this valve structure including a sliding thimble 137 which moves within a valve housing 138. A triangular shaped valve opening 139 is formed through the wall of the valve element 137 and may be advanced or retracted with relation to an opening 140 in the valve housing 138 so that the bleeder valve action will be in direct relation to the pressure of the column, as imparted through tube 30. An adjusting screw 141 may be provided to act upon a spring 142 and control the operation of the valve, the structure being particularly shown in Figs. 6 and 7 of the drawings.

By reference to Fig. 8 of the drawings it will be seen that the stethoscope earphones, generally indicated at 24, comprise tips 143 which may be inserted into the chamber of the outer ear. These tips are connected with tubes 23, leading to the stethoscope, or sound pickup, and preferably are supported upon a resilient member 144 which carries a pair of handle grips 145 which may be grasped to flex member 144, thus separating the tips 143 so that they may be properly spaced within the ear, after which the handles may be released while the machine is being operated and may then be re-grasped to remove the earphones and to permit them to be placed in a sterilizing compartment 146 carried on the front of the machine.

In order to insure that persons may not burst the tube 28 or the bulb 29 by attempting to pump air into the apparatus when the valve 27 is in its closed position, as shown in Fig. 11 of the drawings, a relief passageway 147 is cut longitudinally of the rotary valve element 27'. The passageway 147 will be in register with the port through the wall of valve 27 in communication with the tube 28 when the main valve passageway 148 is in register with bleeder tube 30 and the side passageway 149 is in register with tube 26. At such a time, air from tube 28 will be vented through the exhaust ports 150 (see Fig. 12). The valve element 27' is rotated by its lever arm 39' which engages the coin controlled member 39.

By reference to Fig. 9 it will be seen that a plurality of annular cuffs 170 are shown. These cuffs are of different diameters and may be selected to fit the particular arm of the operator, each of the cuffs being provided with a pressure conduit 171 leading to a selecting valve 172 by which the main pressure lines may be selectively placed in communication with one of the tubes 171.

Referring particularly to Fig. 14 of the drawings, an alternative means of visually retaining a reading of the blood pressure test is shown. This structure makes it possible to establish the point at which systolic and diastolic blood pressure readings occurred and will accomplish manually and in an elemental manner the result brought about by the operation of the full electric machine as shown in Figs. 3 and 4 of the drawings, the difference in manual operation being that for this particular case indicators are separately set manually while in the case of the electric machine, a button is pressed to set the apparatus correspondingly. The structure shown in Fig. 14 comprises a guide member 151 upon which a pair of sliding index pointers 152 and 153 are mounted. These index pointers may be moved longitudinally of the scale 129 and may be set to correspond to the systolic and diastolic blood pressure reading.

By reference to Fig. 8 of the drawings, a cross-sectional view of the arm rest, the cuff and the stethoscope are shown. This arm rest indicated at 15 is trough-shaped in cross-section and the cuff 18 is fixed therein. It is preferable that on the right hand side of the arm rest a rigid upwardly extending shield 154 be provided. This shield curves slightly over the arm when in position and forms a secure backing for the cuff at the point where blood pressure readings are taken. The stethoscope mounted within the shield has a curved frame so that it will properly conform to the contour of the arm in the area where the reading is taken and will insure that all of the sound is adequately transmitted to the diaphragm or other sound pick-up means of the stethoscope. This is highly desirable since these machines are installed in public places and make it imperative that a maximum sound impulse shall be obtained which may be rendered audible to the operator under the most unfavorable conditions. A strap, or flap, 155 extends from the opposite side of the arm rest and overlaps the shield 154. This strap member is preferably formed with a plurality of perforations, one of which may receive a lock pin 156 extending from the face of the shield 154 to temporarily hold the flap 155 in position prior to inflation of the cuff.

It might occur in operation of the present machine that an inexperienced person would attempt to continue to pump the machine beyond its intended pressure capacity. For that reason, as shown in Fig. 3 of the drawings, an overflow reservoir 158 is fitted upon the upper end of the leg 43 of the mercury tube. This reservoir encompasses an upwardly extending length of the tube 43 to a point below return flow openings 159. These openings permit the mercury which has been pumped over the top of the tube leg 43 to flow into the reservoir 158 and return into the tube. An air vent 160 is formed in the reservoir near its top and is protected by shield 161.

In operation of the present invention a person whose blood pressure is to be tested assumes a comforaable position upon the seat 13. Attention must be called to the fact that heretofore blood pressure tests have usually been made by a skilled physician who is thoroughly familiar with the problems involved, as well as the correct placement of the apparatus. In the present case, however, the person making the test must adjust and manipulate the machine. He is usually unfamiliar with the problem involved and is often nervous and excited. This places him under body tension which defeats the making of an accurate test. It is necessary therefore to design the apparatus so that it can be applied properly and so that the test can be made under uniform and desirable conditions in order to obtain an accurate reading. This is insured in the present apparatus by properly seating the patient, properly supporting the arm without tension, and applying the cuff and stethoscope accurately to the patient's arm. After adjusting the seat 13 to properly dispose the patient with relation to the instrument when seated, the patient places his left arm in the arm rest with the palm of the hand turned upwardly and the elbow of the arm resting at the bottom of the longitudinal angle of the trough. This will present the distal portion of the upper arm to the stethoscope 22. While in this position the person takes the flap 155 of the arm rest 15 in the right hand and pulls it over to the right, fastening a suitable perforation over the pin 156. A coin may then be placed in the coin slot of the operating bar 39, after which the bar may be forced inwardly. This movement will swing the lever 39 and thereby move the valve member 27' from the position indicated in Fig. 11 of the drawings to the position indicated in Fig. 10 of the drawings at which time the main passageway 148 through the valve will be in alignment with the ports from the tube 28 to the tube 26. By pressing successively on the bulb 29 air will be forced through the tube 28, the passageway 148 of the valve 27 to the tube 26 leading simultaneously to the cuff 18 and the manometer 41, the latter connection being through tubes 32 and 40. Normally the pumping should be continued until the mercury in leg 43 of the U-tube 42 reaches the graduation indicating the pressure of 220. When the column has thus been elevated as observed on the gage 129, the pumping may be discontinued. If it is further continued the mercury may be forced into the overflow reservoir 158, or under excessive pressure the pop-off valve 33 may act to relieve pressure in the system. The coin control bar 39 is then retracted to its original position. This will swing the lever 39' to dispose the valve element 27' in the position shown in Fig. 11 of the drawings where communication will be established between the pressure tube 26 and the exhaust tube 30. The pressure of air will then gradually be relieved from the pressure system through the bleeder valve structure 31. At this time the exhaust of air through the bleeder valve is out of control completely, save for operation of the separate emergency valve 34 through which the air may be rapidly exhausted. The thimble 137 within this member will move as influenced by varying pressure due to the change in the head of the mercury column so as to change the effective area of exhaust opening 140 as the thimble slides and as its slotted port 139 registers therewith. This causes the mercury column to fall at a uniform rate so that the operator will have less difficulty in following the level of the column and making a reading.

During the period in which the pressure system of the apparatus is being supplied with air by operation of the bulb 29, the mercury column will rise in leg 43 of the U tube 42 and will proportionately fall in leg 44 of the tube 42. When the surface of the top of the column of mercury reaches a level at which contacts 48 and 49 are provided in the wall of the tube 43, a circuit will be completed from the source of electric energy 47 through conductor 50 to the contact 48, thence through the mercury to conductor 51 and then to solenoid 60 to the conductor 62 and the switch contact 61, after which the current passes through the switch blade 63 to a return wire 64' leading to the opposite side of the source of energy 47. This circuit will be only momentarily completed, however, since energization of solenoid 60 will cause the switch member 63 to swing, breaking the circuit at contact 61 and simultaneously establishing a circuit from conductor 64' through the switch blade 63 to the contact 66 and thence to the bus bar 68. A plurality of circuits will then be partially prepared through conductors 69 to contacts 70. These contacts are at various levels along the wall of the leg 44 of the tube and in inverse order to contacts 71 disposed along the wall of the tube leg 43. Thus, there will only be one contact 70 and one contact 71 through which a circuit can be made at any one time by the column of mercury within the tube. Selecting any one of the contacts 70 as being a proper one, it will be seen that the current will pass along the column of mercury and then to the contact 71, there passing along a wire 72 to a corresponding light 73 of the gauge 130. This light will be illuminated as the current passes through conductor 74 to a solenoid 75, thereafter continuing along the conductor 76 to the bus bar 77 and being completed to the source through conductor 78. The solenoid 75 closes the switch circuit from bus bar 77 through a conductor 80' to a contact 80 and thence through a contact 81 to wire 81', which connects with a solenoid 83. The current then flows along conductor 84 to lead wire 85 to the switch button 86. The circuit from this button is completed along the wire 87 to the bus bar 68. It will thus be seen that while the movement of the switch member 79 to contact members 80 and 81 will partially complete circuits through the solenoids 83 they will not be completed until the closing of switch 86, which may be optionally accomplished at the discretion of the operator.

After all of the circuits have been partially prepared for a test, as previously described, the operator places the stethoscope structure 24 upon his head with the tips 143 properly adjusted to the ears. A blood pressure test is then made and a record is completed at the discretion and by the manual operation of the wearer of the stethoscope. This person in the present instance is intended to be the patient whose blood pressure is being taken. The test record is made by the operator as based upon the phenomena that when the cuff 18 has been inflated until a pressure is imposed upon the artery in excess of any maximum pressure in the artery the pulse beat will be inaudible. During the operation of the machine the air pressure is relieved from the cuff and the pressure imposed upon the artery thus progressively lowers. When this pressure equals that of the maximum pressure in the artery the pulse beat is first audible in the stethoscope. At this point of audibility the pressure is known as systolic blood pressure. This audibility will continue as the pressure in the cuff contues to drop until the pressure in the cuff approximates the pressure known as diastolic blood pressure. After the pressure in the cuff has become lowered to a pressure less than the diastolic pressure, audibility of the pulse in the stethoscope discontinues. These two pressures, to-wit: systolic and diastolic pressure, are the pressures observed by a physician in the use of the ordinary clinical blood pressure measuring devices. In the present instance, however, definite indication and a definite record are required, thus the operator upon hearing the first audible pulse beat in the stethoscope presses the button 86 to complete a circuit indicating the systolic pressure, and as the operator continues to listen to the stethoscope he will detect when the pulse beat is inaudible and will again press the button 86, which will close an appropriate circuit to indicate diastolic pressure. At each time the button 86 with its switch is actuated, a circuit through a solenoid 83 corresponding to the level at which the mercury column then stands in the tube 42 will be closed. This energizes the solenoid 83 to draw a switch member 88 into contact with members 89 and 90, then completing the circuit along the wire 92 through a light 132 of the scale 131. This light will remain illuminated until the cycle of operation of the machine has been completed. The lights 73 will progressively be illuminated in correspondence to the height of the column of mercury within the leg 43 of the tube. The circuit from conductor 92 is then continued through a corresponding solenoid 93 which connects suitable printing mechanisms, details of which have not been shown in the present case. The circuit then continues along wire 94 to the bus bar 68. After the column of mercury has fallen in tube leg 43 and has risen in tube leg 44 until contact is made with contacts 99 and 100, a circuit will then be completed from the bus bar 68 through a wire 101 to contact 100, then across the mercury column to contact 99 and then along the wire 98 to the solenoid 96, which when energized breaks the circuit for solenoid 93 and restores the circuit breaker 88 to its original position. The circuit is then completed through the wire 97 to the lead wire 91 and then to the bus bar 77. When the pressure in the system is additionally lowered, the column of mercury in leg 44 will rise so that contacts will be made between the members 104 and 105. This will complete a circuit from bus bar 68 through wire 101 to wire 103 and contact 104. The circuit may then pass across the column of mercury to conductor 105 and then along wire 106 to one side of the solenoid 102. The opposite side is connected with wire 50 leading to the source of energy 47. This energizes solenoid 102, swinging the switch blade 63 to its original position into contact with member 61 and out of contact with member 66. The circuits throughout the machine are then completely interrupted and the apparatus is ready for the next test. The printing mechanisms 95 will deliver a printed ticket into the receptacle provided for the purpose on the front of the machine. The ear phones may then be moved and their tips placed in the sterilization compartment 146 so that the machine will be in condition for a subsequent cycle of operation as previously described.

It will be evident that from the foregoing disclosure the blood pressure machine here shown and described is simple in operation and construction, making it possible for the machine to be placed in the hands of the general public for making blood pressure tests of their own, the tests being accurate and giving all of the data which would be obtainable by the use of a clinical type of blood pressure machine in the hands of a physician or surgeon.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent is:

1. A blood pressure testing machine comprising pressure applying means adapted to be associated with the arm of a person whose blood pressure is being taken, pressure measuring means connected therewith and including a U-tube containing mercury, pressure creating means acting upon the pressure applying means and the measuring means, whereby the body of mercury will be shifted in position within the legs of the U-tube under application of pressure of different magnitude, and electrically energized pressure indicating means connected with the U-tube, and including a plurality of separate circuits, individually affecting the indicating means in direct relation to the various positions of the body of mercury within the column, whereby the blood pressure of the patient will be indicated, and control means affected by the position of said mercury column for initiating and interrupting a flow of electric current to the aforesaid circuits.

2. A blood pressure testing machine comprising pressure applying means adapted to be associated with the arm of a person whose blood pressure is being taken, pressure measuring means connected therewith and including a U-tube containing mercury, pressure creating means acting upon the pressure applying means and the measuring means, whereby the body of mercury will be shifted in position within the legs of the U-tube under application of pressure of different magnitude, and electrically energized pressure indicating means connected with the U-tube, and including a plurality of of separate circuits, individually affecting the indicating means in direct relation to the various positions of the body of mercury within the column, whereby the blood pressure of the patient will be indicated, control means affected by the position of said mercury column for initiating and interrupting a flow of electric current to the aforesaid circuits, and valve means for establishing communication between the pressure creating means and the U-tube and pressure applying means.

3. In a blood pressure testing machine, a U-tube, a column of mercury therein, a conduit connected therewith whereby fluid under pressure may be delivered to the tube to elevate the column of mercury, a bleeder valve for relieving said pressure to allow the column of mercury to fall, said bleeder valve automatically acting to control the escape of fluid under pressure whereby the column of mercury will fall at a uniform rate.

4. A blood pressure testing machine comprising a cuff adapted to be mounted upon the arm of the patient, means for delivering a supply of air under pressure to the cuff, valve means for establishing and interrupting said air supply, a manometer in the air line from the valve to the cuff said manometer including a U tube, complementary contacts along opposite legs of said tube, circuits including said complementary contacts and adapted to be closed at different relative levels of the mercury in the tube, recording means selectively prepared for actuation as the mercury in the manometer reaches different levels, and means optionally controlled by the operator for actuating said recording means.

5. The structure defined in claim 4 having visual means indicating the successive circuits completed by the movement of the column of mercury within the U tube to indicate to the operator when the recording means should be actuated.

6. The structure defined in claim 4 having, a switch mechanism for controlling the electrical circuit to the machine and electric circuits including contacts in the legs of the manometer whereby an input of electric energy to the machine will be automatically established when the mercury level reaches a desired point between said contacts.

7. The structure defined in claim 4 having a switch mechanism for controlling the electrical circuit to the machine and electric circuits including contacts in the legs of the manometer whereby an input of electric energy to the machine will be automatically established when the mercury level reaches a desired point between certain of said contacts, and means whereby the electrical input circuit will be broken when the mercury in the tubes reaches a predetermined low level between certain of said contacts.

8. A blood pressure testing machine comprising a manometer including a U-tube containing mercury, an arm cuff connected therewith, a bulb structure for supplying air under pressure to the arm cuff and the manometer, a control valve adapted to establish and interrupt communications between the bulb and the cuff and the manometer, a bleeder valve placed in communication with the cuff and manometer between the control valve when the control valve is closed, means embodying in said bleeder valve for automatically maintaining a uniform exhaust flow of air from the cuff and the manometer, an electric pressure indicating device and circuits including said indicating device and contacts placed along the opposite legs of the U tube whereby the pressure indicating means may be actuated to correspond with the pressure in the manometer and cuff.

9. A blood pressure testing machine including a support, an arm rest carried by said support, said rest comprising a troughlike structure upon which the upper and forearm of a person may be supported, said sections being disposed in angular relation to each other whereby the distal portion of the arm will rest thereon and be relaxed, pressure applying means associated with the upper arm supporting portion of said rest and adapted to apply pressure to the arm of the person whose blood pressure is being tested, blood pressure indicating means, means for supplying air under pressure to the pressure applying means and indicating means, and a valve adapted to control the flow of air from the pressure supplying means to the pressure applying means and indicating means.

10. In a blood pressure testing machine, an arm rest comprising a troughlike structure having sections disposed at an angle to each other and receiving the upper and forearm of a person whose blood pressure is to be tested, and a pressure cuff carried by the forearm support of said rest to embrace the forearm of the patient.

11. In a blood pressure testing machine, a cuff adapted to encircle the arm of a person whose blood pressure is being tested, means for supplying air under pressure to said cuff whereby a desired magnitude of pressure will be created, a mercury gauge connected with said pressure cuff to indicate the pressure magnitude, pressure relief means in communication with the cuff and gauge, and means associated therewith and automatically operated to control the fall of mercury in said column so that it will be constant as the pressure is relieved.

GEORGE A. SNYDER.